US009794471B2

(12) United States Patent
Tanaka

(10) Patent No.: US 9,794,471 B2
(45) Date of Patent: Oct. 17, 2017

(54) IMAGING DEVICE AND FOCUSING CONTROL METHOD

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/202,114

(22) Filed: Jul. 5, 2016

(65) Prior Publication Data
US 2016/0316136 A1 Oct. 27, 2016

Related U.S. Application Data

(63) Continuation of application No. PCT/JP2014/076946, filed on Oct. 8, 2014.

(30) Foreign Application Priority Data

Feb. 7, 2014 (JP) ................................ 2014-022469

(51) Int. Cl.
H04N 5/225 (2006.01)
H04N 5/232 (2006.01)
(Continued)

(52) U.S. Cl.
CPC ......... H04N 5/23212 (2013.01); G02B 7/285 (2013.01); G02B 7/34 (2013.01);
(Continued)

(58) Field of Classification Search
CPC ..................... H04N 5/3696; H04N 5/2356
(Continued)

(56) References Cited

U.S. PATENT DOCUMENTS 5,218,394 A 6/1993 Ueda et al.
5,379,088 A 1/1995 Ueda et al.
(Continued)

FOREIGN PATENT DOCUMENTS

EP 1 906 657 A2 4/2008
JP 3-161726 A 7/1991
(Continued)

OTHER PUBLICATIONS

International Search Report for PCT/JP2014/076946 (PCT/ISA/210) mailed on Jan. 20, 2015.
(Continued)

Primary Examiner — Twyler Haskins
Assistant Examiner — Dwight C Tejano
(74) Attorney, Agent, or Firm — Birch, Stewart, Kolasch & Birch, LLP

(57) ABSTRACT

The present invention provides an imaging device and a focusing control method capable of reliably preventing the accuracy of a focusing control from being lowered even in a case where a signal level of a phase difference detection pixel is low. A system control unit (11) calculates, using detections signals of phase difference detection pixels (52A, 52B) obtained by each of two instances of imaging which are consecutively performed by an imaging element (5), first defocus amounts for each instance of imaging, adds up detection signals corresponding to the detection signals of the phase difference detection pixels (52), among captured image signals obtained by each of two instances of imaging, calculates a second defocus amount using signals after addition, and compares the plural of first defocus amounts and the second defocus amount to determine whether to perform a focusing control based on the second defocus amount.

20 Claims, 12 Drawing Sheets

(51) Int. Cl.
   *G02B 7/34*   (2006.01)
   *H04N 9/04*   (2006.01)
   *G02B 7/28*   (2006.01)
   *G02B 7/36*   (2006.01)
   *H04N 5/369*  (2011.01)
   *G03B 13/36*  (2006.01)

(52) U.S. Cl.
   CPC ........... *G02B 7/365* (2013.01); *H04N 5/3696* (2013.01); *H04N 9/045* (2013.01); *G03B 13/36* (2013.01)

(58) Field of Classification Search
   USPC ...................................... 348/222.1, 340, 345
   See application file for complete search history.

(56) References Cited

U.S. PATENT DOCUMENTS

| | | | |
|---|---|---|---|
| 8,634,015 B2 | 1/2014 | Kimura | |
| 2008/0084483 A1 | 4/2008 | Kusaka | |
| 2008/0291311 A1* | 11/2008 | Kusaka | G02B 7/346 348/308 |
| 2011/0007176 A1* | 1/2011 | Hamano | H04N 5/23212 348/222.1 |
| 2011/0310266 A1 | 12/2011 | Kato et al. | |
| 2012/0300104 A1* | 11/2012 | Onuki | H04N 5/23212 348/302 |
| 2014/0184889 A1* | 7/2014 | Wada | H04N 5/23212 348/353 |
| 2015/0286112 A1* | 10/2015 | Inoue | G02B 7/36 348/357 |
| 2015/0296125 A1* | 10/2015 | Kusaka | G02B 7/34 348/349 |

FOREIGN PATENT DOCUMENTS

| | | |
|---|---|---|
| JP | 2001-330882 A | 11/2001 |
| JP | 2008-85738 A | 4/2008 |
| JP | 2010-91991 A | 4/2010 |
| JP | 2012-8212 A | 1/2012 |

OTHER PUBLICATIONS

Written Opinion of the International Searching Authority for for PCT/JP2014/076946 (PCT/ISA/237) mailed on Jan. 20, 2015.

* cited by examiner

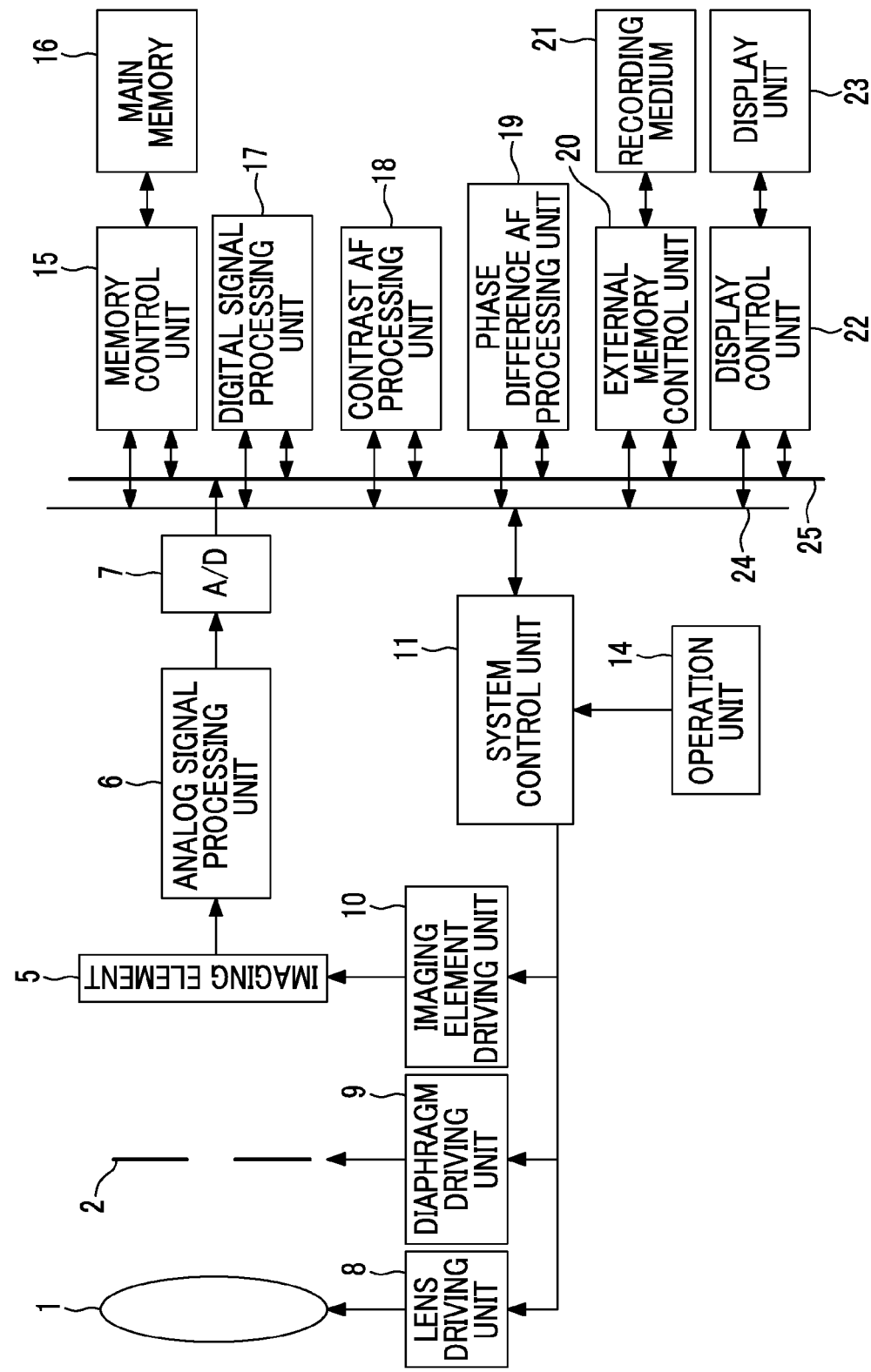

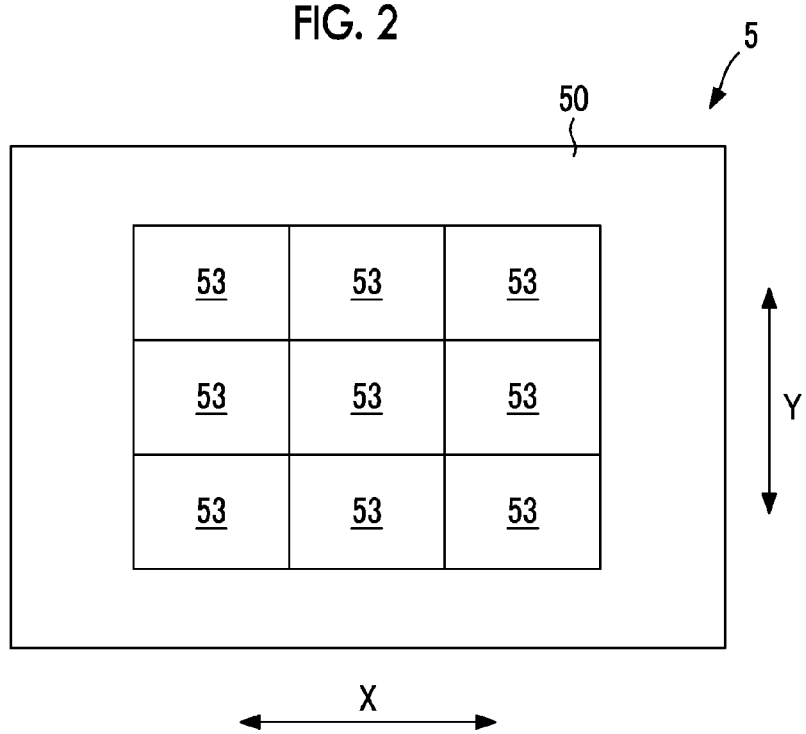
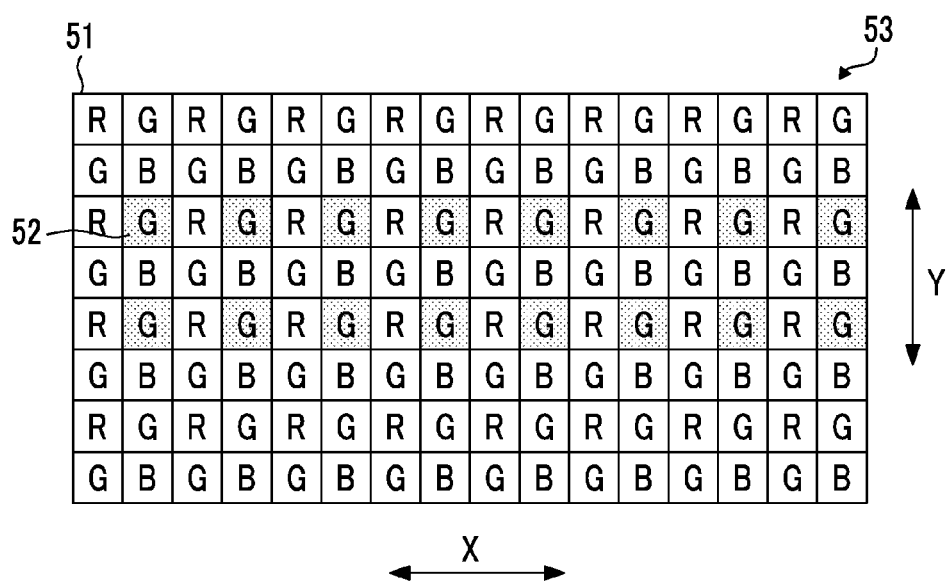

IMAGING DEVICE AND FOCUSING CONTROL METHOD

CROSS-REFERENCE TO RELATED APPLICATIONS

This application is a Continuation of PCT International Application No. PCT/JP2014/076946 filed on Oct. 8, 2014, which claims priority under 35 U.S.C §119(a) to Japanese Patent Application No. 2014-022469 filed on Feb. 7, 2014. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to the increase in resolution of an imaging element such as a charge coupled device (CCD) image sensor or a complementary metal oxide semiconductor (CMOS) image sensor, demand for information devices having an imaging function, such as a digital still camera, a digital video camera, a mobile phone such as a smart phone, or a personal digital assistant (PDA) has rapidly increased. Such an information device having an imaging function is referred to as an imaging device.

In such an imaging device, as a focusing control method for focusing on a main subject, a contrast auto-focus (AF) method or a phase difference AF method (for example, see JP2010-91991A, JP2012-8212A, and JP2001-330882A) is employed.

As a solid-state imaging element mounted in an imaging device that performs focusing control by a phase difference AF method, for example, a solid-state imaging element in which pairs of phase difference detection pixels in which light-shielding film openings are eccentric in reverse directions are discretely provided over an entire imaging surface is used.

A phase difference detection pixel has a sensitivity lower than that of a normal imaging pixel in which light-shielding openings are not eccentric with respect to a photoelectric conversion unit. Thus, in a case where a subject is placed in a low-intensity light, a signal level obtained from a phase difference detection pixel is reduced. In order to compensate for this reduction of the signal level, if a correlation operation is simply performed through a gain-up process, an error occurs in the correlation operation result.

JP2010-91991A discloses a configuration in which output signals in adjacent phase difference detection pixels are added up and a correlation operation for determining a defocus amount is performed using signals after the addition.

Further, JP2012-8212A discloses a configuration in which signals of phase difference detection pixels disposed at the same position in plural captured image signals obtained through consecutive imaging at a low luminance or with a large amount of defocus are added up and a defocus amount is calculated through a correlation operation using signals after the addition.

According to the configurations disclosed in JP2010-91991A and JP2012-8212A, it is possible to increase the intensity of signals by adding up signals of the phase difference detection pixels, and thus, it is possible to perform a focusing control with high accuracy even with respect to a dark subject.

SUMMARY OF THE INVENTION

As in the imaging device disclosed in JP2010-91991A, a method for adding up signals of phase difference detection pixels with respect to plural captured image signals obtained at different timings is effective in a case where a subject does not change. However, in a case where the subject changes, since a correlation operation is performed by adding up signals of phase difference detection pixels in two imaging scenes having a probability that defocus amounts are different from each other, there is a probability that an error may occur in the correlation operation result.

The imaging device disclosed in JP2012-8212A has a configuration in which signals of phase difference detection pixels which are present at different positions are added up, the number of the phase difference detection pixels is reduced to calculate a defocus amount, and thus, the accuracy of a correlation operation result is lowered.

The imaging device disclosed in JP2001-330882A has a configuration in which a shutter speed is increased in a case where a moving body is included in a subject. However, if the shutter speed is increased, a light exposure value becomes insufficient, and thus, it is not possible to solve a problem in that the accuracy of focusing is lowered with respect to a dark subject.

In order to solve the above-mentioned problems, an object of the invention is to provide an imaging device and a focusing control method capable of reliably preventing the accuracy of a focusing control from being lowered even in a case where a signal level of a phase difference detection pixel is low.

According to an aspect of the invention, an imaging device includes: an imaging element that includes a first signal detection unit that detects a signal corresponding to one beam among a pair of beams that passes through different portions in a pupil region of an imaging optical system and a second signal detection unit that detects a signal corresponding to the other beam among the pair of beams, and images a subject through the imaging optical system; a first defocus amount calculation unit that calculates a plurality of first defocus amounts using detection signals of the first signal detection units and detection signals of the second signal detection units in a range corresponding to an area which is a focusing target on an imaging surface of the imaging element, among captured image signals obtained through each of a plurality of instances of imaging consecutively performed by the imaging element; a second defocus amount calculation unit that adds up, with respect to the detection signals of the first signal detection units in the range among the captured image signals obtained through each of the plurality of instances of imaging, detection signals at the same position in the range, adds up, with respect to the detection signals of the second signal detection units in the range among the captured image signals obtained through each of the plurality of instances of imaging, detection signals at the same position in the range, and calculates a second defocus amount using the detection signals of the first signal detection units and the detection signals of the second signal detection units after addition; and a determination unit that determines whether to perform a focusing control of the imaging optical system based on the second defocus amount through comparison of the plurality of first defocus amounts and the second defocus amount.

According to another aspect of the invention, a focusing control method includes: a first defocus amount calculation step of calculating a plurality of first defocus amounts using detection signals of the first signal detection units and detection signals of the second signal detection units in a range corresponding to an area which is a focusing target on an imaging surface of the imaging element, among captured image signals obtained through each of a plurality of instances of imaging consecutively performed by an imaging element that includes a first signal detection unit that detects a signal corresponding to one beam among a pair of beams that passes through different portions in a pupil region of an imaging optical system and a second signal detection unit that detects a signal corresponding to the other beam among the pair of beams, and images a subject through the imaging optical system; a second defocus amount calculation step of adding up, with respect to the detection signals of the first signal detection units in the range among the captured image signals obtained through each of the plurality of instances of imaging, detection signals at the same position in the range, adding up, with respect to the detection signals of the second signal detection units in the range among the captured image signals obtained through each of the plurality of instances of imaging, detection signals at the same position in the range, and calculating a second defocus amount using the detection signals of the first signal detection units and the detection signals of the second signal detection units after addition; and a determination step of determining whether to perform a focusing control of the imaging optical system based on the second defocus amount through comparison of the plurality of first defocus amounts and the second defocus amount.

According to the invention, it is possible to provide an imaging device and a focusing control method capable of reliably preventing the accuracy of a focusing control from being lowered even in a case where a signal level of a phase difference detection pixel is low.

BRIEF DESCRIPTION OF THE DRAWINGS

FIG. 1 is a diagram illustrating a schematic configuration of a digital camera which is an example of an imaging device for describing an embodiment of the invention.

FIG. 2 is a schematic plan view illustrating an overall configuration of an imaging element 5 mounted on the digital camera shown in FIG. 1.

FIG. 3 is a partially enlarged view of a single AF area 53 shown in FIG. 2.

DESCRIPTION OF THE PREFERRED EMBODIMENTS

Figure 4:
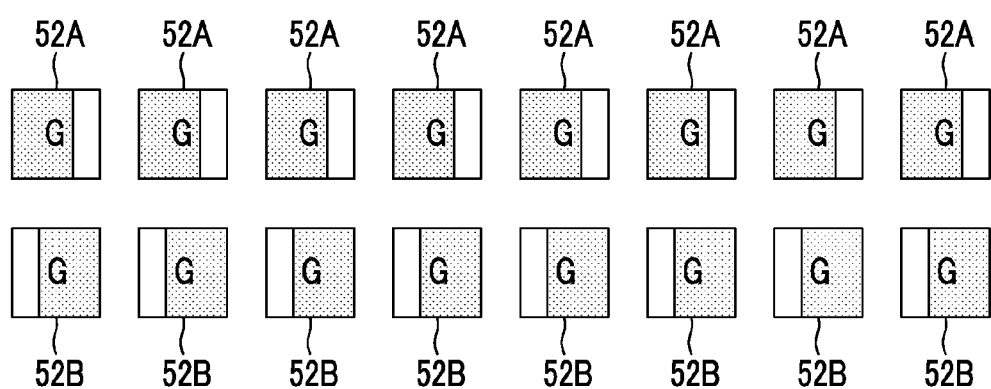
FIG. 4 is a diagram illustrating only a phase difference detection pixel 52 shown in FIG. 3.

Hereinafter, embodiments of the invention will be described with reference to the accompanying drawings.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system.

The lens device shown in FIG. 1 is fixed to a camera main body, but may be exchanged with another lens device. The imaging lens 1 may include at least the focus lens. And the focus lens may be a single focus lens that performs focus adjustment by moving the entirety of the lens system.

The digital camera includes an imaging element 5 of a CCD type, a CMOS type, or the like that images a subject through the imaging optical system, an analog signal processing unit 6 that is connected to an output end of the imaging element 5 and performs analog signal processing such as a correlated double sampling process, and an A/D conversion circuit 7 that converts an analog signal output from the analog signal processing unit 6 into a digital signal.

The analog signal processing unit 6 and the A/D conversion circuit 7 are controlled by a system control unit 11. The analog signal processing unit 6 and the A/D conversion circuit 7 may be built in the imaging element 5.

The system control unit 11 that generally controls the entirety of an electric control system of the digital camera performs a focusing control for controlling a lens driving unit 8 and driving the focus lens included in the imaging lens 1 to be focused on a main subject, or adjusts the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 to the imaging element 5 as a captured image signal. An instruction signal from a user is input to the system control unit 11 through an operation unit 14. The instruction signal includes an instruction signal for instructing execution of a focusing control of the imaging optical system.

Further, the electric control system of the digital camera includes a main memory 16, a memory control unit 15 connected to the main memory 16, a digital signal processing unit 17, a contrast AF processing unit 18, a phase difference AF processing unit 19, an external memory control unit 20 to which a detachable and attachably recording medium 21 is connected, and a display control unit 22 to which a display unit 23 mounted on a rear surface or the like of the camera is connected. The digital signal processing unit 17 generates captured image data by performing an interpolation operation, a gamma correction operation, a RGB/YC conversion process, and the like with respect to a captured image signal output from the A/D conversion circuit 7.

The memory control unit 15, the digital signal processing unit 17, the contrast AF processing unit 18, the phase difference AF processing unit 19, the external memory control unit 20, and the display control unit 22 are connected to each other through a control bus 24 and a data bus 25, and are controlled by instructions from the system control unit 11.

FIG. 2 is a schematic plan view illustrating an overall configuration of the imaging element 5 mounted on the digital camera shown in FIG. 1.

The imaging element 5 includes an imaging surface 50 on which multiple pixels are arranged in a two-dimensional pattern in a row direction X and in a column direction Y orthogonal to the row direction X. In the example of FIG. 2, nine AF areas 53 which are target areas for focusing are provided on the imaging surface 50.

The AF area 53 is an area that includes an imaging pixel and a phase difference detection pixel as pixels.

In a portion where the AF areas 53 are excluded on the imaging surface 50, only imaging pixels are disposed. The AF areas 53 may be provided on the imaging surface 50 without a gap.

FIG. 3 is a partially enlarged view of a single AF area 53 shown in FIG. 2.

Pixels 51 are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The color filters are arranged in the form of a Bayer array over the entirety of the imaging surface 50.

In the AF area 53, a part of the G pixels 51 (shaded pixels 51 in FIG. 3) are used as the phase difference detection pixels 52. In the example of FIG. 3, each G pixel 51 in an arbitrary pixel row among pixel rows including the R pixels 51 and the G pixels 51, and the G pixel 51 closest to each G pixel 51 in the column direction Y are used as the phase difference detection pixels 52. Here, as shown in FIG. 3, one direction in the two-dimensional array, which is the same direction as a phase difference separation direction, is defined as the X direction or the row direction, and the other direction is defined as the Y direction or the column direction.

FIG. 4 is a diagram illustrating only the phase difference detection pixels 52 shown in FIG. 3.

As shown in FIG. 4, the phase difference detection pixels 52 include two types of pixels which are phase difference detection pixels 52A and phase difference detection pixels 52B.

The phase difference detection pixel 52A is a first signal detection unit that receives one beam among a pair of beams that passes through different portions in a pupil region of the imaging lens 1 and detects a signal depending on the intensity of received light.

The phase difference detection pixel 52B is a second signal detection unit that receives the other beam among the pair of beams and detects a signal depending on the intensity of received light.

In the AF area 53, plural pixels 51 other than the phase difference detection pixels 52A and 52B are imaging pixels, and each imaging pixel receives the pair of beams that passes through the imaging lens 1, and detects a signal depending on the intensity of received light.

A light shielding film is provided above the photoelectric conversion unit of each pixel 51, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A.

Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

Figure 5:
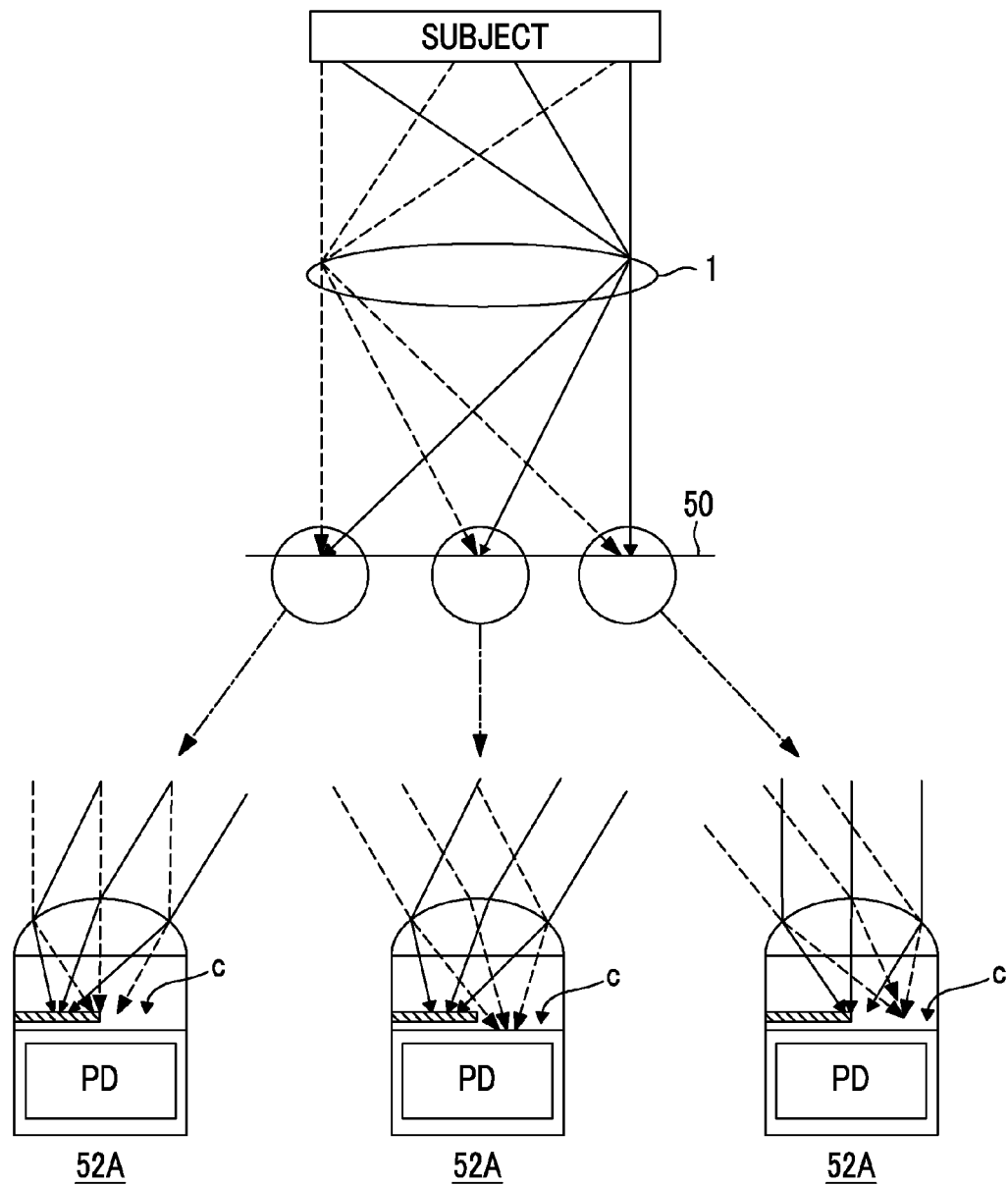
FIG. 5 is a diagram illustrating a sectional configuration of a phase difference detection pixel 52A.

FIG. 5 is a diagram illustrating a sectional configuration of the phase difference detection pixel 52A. As shown in FIG. 5, an opening C of the phase difference detection pixel 52A is eccentric rightward with respect to the photoelectric conversion unit (PD).

As shown in FIG. 5, by covering one side of the photoelectric conversion unit by the light shielding film, it is possible to selectively shield light incident in a direction opposite to a side where the photoelectric conversion unit (PD) is covered by the light shielding film.

With such a configuration, it is possible to detect, using a pixel group that includes the phase difference detection pixels 52A which are positioned in an arbitrary row and a pixel group that includes the phase difference detection pixels 52B which are disposed at the same distance in the same direction with respect to each of the phase difference detection pixels 52A of the former pixel group, a phase difference in the row direction X in images respectively captured by each pixel of the two pixel groups.

The imaging element 5 may have any configuration in which plural pairs of a first signal detection unit group that receives one beam among a pair of beams that passes through different portions in a pupil region of the imaging lens 1 and detects a signal depending on the intensity of received light and a second signal detection unit that receives the other beam among the pair of beams and detects a signal depending on the intensity of received light are provided, and thus, is not limited to the configurations shown in FIGS. 2 to 5.

For example, a configuration in which the entire pixels included in the imaging element 5 are used as the imaging pixels 51, and each imaging pixel 51 is divided into two pieces, in which one divided area is used as the phase difference detection pixel 52A and the other divided area is used as the phase difference detection pixel 52B may be used.

Figure 6:
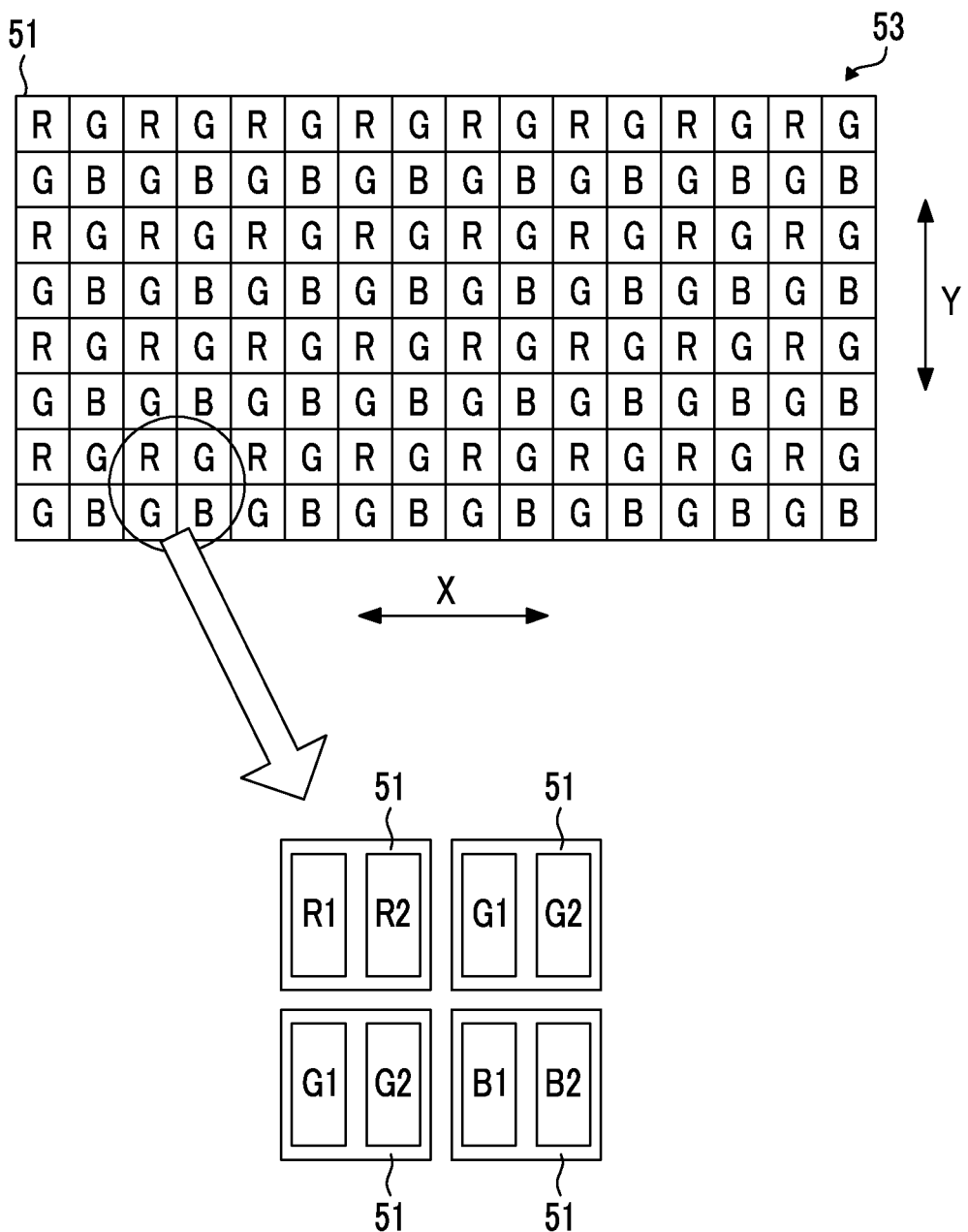
FIG. 6 is a diagram illustrating a configuration in which all pixels included in the imaging element 5 are used as imaging pixels 51.

FIG. 6 is a diagram illustrating a configuration in which all pixels included in the imaging element 5 are used as the imaging pixels 51, and each imaging pixel 51 is divided into two pieces.

In the configuration shown in FIG. 6, the imaging pixel 51 with R in the imaging element 5 is divided into two pieces, in which the divided two pieces are a phase difference detection pixel R1 and a phase difference detection pixel R2, respectively.

In addition, the imaging pixel 51 with G in the imaging element 5 is divided into two pieces, in which the divided two pieces are a phase difference detection pixel G1 and a phase difference detection pixel G2, respectively.

Furthermore, the imaging pixel 51 with B in the imaging element 5 is divided into two pieces, in which the divided two pieces are a phase difference detection pixel B1 and a phase difference detection pixel B2, respectively.

In such a configuration, the phase difference detection pixels R1, G1, and B1 serve as the first signal detection units, respectively, and the phase difference detection pixels R2, G2, and B2 serve as the second signal detection units, respectively. It is possible to independently read signals from the first signal detection units and the second signal detection units.

Further, as the signals of the first signal detection units and the second signal detection units are added up, thereby normal imaging signals without a phase difference are obtained. That is, in the configuration shown in FIG. 6, the entire pixels may be used as both of the phase difference detection pixels and the imaging pixels.

The phase difference AF processing unit 19 shown in FIG. 1 calculates a phase difference which is a relative position deviation amount of two images formed by the pair of beams using a correlation operation of detection signal groups read from the phase difference detection pixels 52A and the phase difference detection pixels 52B disposed in one AF area 53 selected from nine AF areas 53 through a user's operation or the like.

Therefore, the phase difference AF processing unit 19 calculates a defocus amount which is the amount of movement of a focus lens necessary for matching an image forming surface of a main subject to an imaging surface 50 of the imaging element 5 by the imaging lens 1, based on the phase difference.

As the AF area 53, a single area may be selected, or plural areas which are continuously arranged may be selected.

The contrast AF processing unit 18 shown in FIG. 1 analyzes an image captured by one AF area 53 selected from nine AF areas 53 through a user's operation or the like, and determines a focusing position of the imaging lens 1 according to a known contrast AF method.

That is, the contrast AF processing unit 18 calculates, while moving the position of the focus lens of the imaging lens 1 under the control of the system control unit 11, contrast (brightness difference) of images obtained at respective movement positions (plural positions). Further, the contrast AF processing unit 18 determines the position of the focus lens where the contrast becomes a maximum value as the focusing position.

As the AF area 53, a single area may be selected, or plural areas which are continuously arranged may be selected.

In the digital camera of this embodiment, as an auto-focus execution instruction is given, thereby the system control unit 11 performs a focusing control based on the phase difference AF method or a focusing control based on the contrast AF method.

Further, the system control unit 11 performs a first focusing control for performing a focusing control based on signals of phase difference detection pixels obtained through one-time imaging and a second focusing control for performing a focusing control based on signals obtained by adding up signals of phase difference detection pixels obtained through plural instances of imaging which are consecutive, as the focusing control based on the phase difference AF method.

Figure 7:
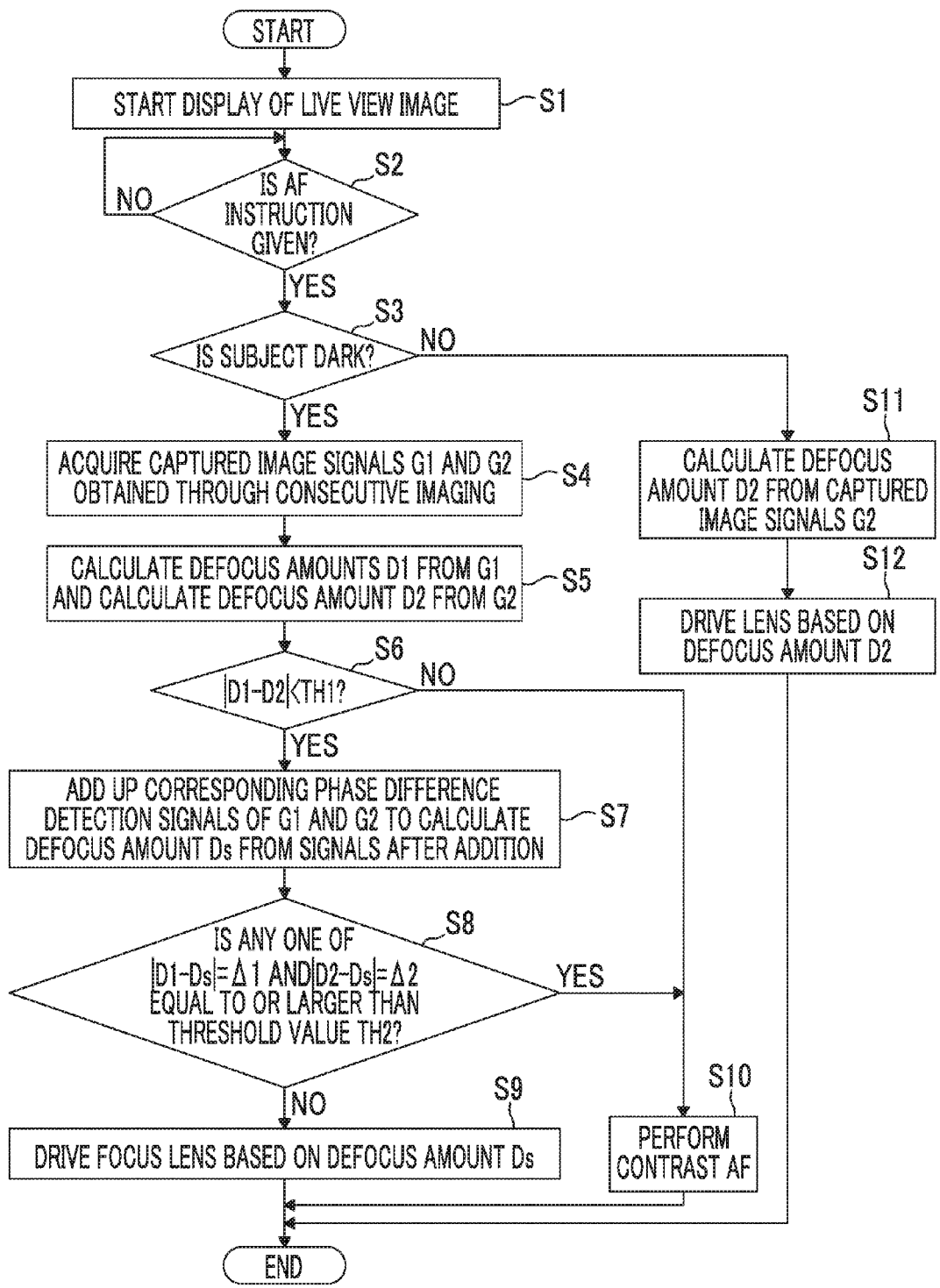
FIG. 7 is a flowchart illustrating an auto-focus operation of the digital camera shown in FIG. 1.

FIG. 7 is a diagram illustrating an operation of the digital camera shown in FIG. 1.

If the digital camera is set to an imaging mode, the system control unit 11 starts display of a live view image (step S1).

Specifically, the system control unit 11 repeats a control for imaging a subject using the imaging element 5 and displaying an image based on captured image data obtained through the imaging on the display unit 23.

After the display of the live view image is started, if an execution instruction (hereinafter, referred to as an auto-focus execution instruction, which is represented as an AF instruction in the figure) of a focusing control of the imaging optical system is given according to a half-push operation or the like of a shutter button provided in the operation unit 14 (step S2: YES), the system control unit 11 determines the brightness of a subject imaged by the imaging element 5 using the latest signals (hereinafter, referred to as captured image signals G2) among captured image signals obtained when the auto-focus execution instruction is given. For example, the system control unit 11 calculates an average or an integrated value of luminance values of the captured image signals G2 as brightness.

If the calculated brightness is equal to or smaller than a threshold value (step S3: YES), the system control unit 11 causes the phase difference AF processing unit 19 to perform a process of step S4, and if the calculated brightness exceeds the threshold value (step S3: NO), the system control unit 11 causes the phase difference AF processing unit 19 to perform a process of step S11.

In step S11, the phase difference AF processing unit 19 performs a correlation operation using a detection signal group of the phase difference detection pixels 52A and a detection signal group of the phase difference detection pixels 52B disposed in a range corresponding to a selected AF area 53, among the captured image signals G2, to calculate a defocus amount D2 which is a first defocus amount. The phase difference AF processing unit 19 functions as a first defocus amount calculation unit.

The system control unit 11 moves the focus lens to a focusing position based on the defocus amount D2 determined in step S11 (step S12), and completes auto-focusing.

In step S4, the phase difference AF processing unit 19 acquires image signals of which an imaging time point is latest and imaging signals of which an imaging time point is second latest from the captured image signals obtained when the auto-focus execution instruction is given. Among the two sets of captured image signals, the image signals of which the imaging time point is later are used as captured image signals G2, and the image signals of which the imaging time point is earlier are used as the captured image signals G1.

After step S4, the phase difference AF processing unit 19 performs a correlation operation using a detection signal group of the phase difference detection pixels 52A and a detection signal group of the phase difference detection pixels 52B disposed in the range corresponding to the selected AF area 53, among the captured image signals G1, to calculate a defocus amount D1 which is the first defocus amount.

Further, the phase difference AF processing unit 19 performs the correlation operation using the detection signal group of the phase difference detection pixels 52A and the detection signal group of the phase difference detection pixels 52B disposed in the range corresponding to the selected AF area 53, among the captured image signals G2, to calculate the defocus amount D2 which is the first defocus amount (step S5).

After step S5, the system control unit 11 determines whether a difference between the defocus amount D1 and the defocus amount D2 calculated by the phase difference AF processing unit 19 is smaller than a threshold value TH1 (step S6).

In a case where the difference between the defocus amount D1 and the defocus amount D2 is equal to or larger than the threshold value TH1 (step S6: NO), it may be determined that there is a large movement in the being imaged subject in a direction vertical to the imaging surface 50.

Thus, the system control unit 11 selects the contrast AF processing unit 18, causes the contrast AF processing unit 18 to determine a focusing position, drives the focus lens to the determined focusing position (step S10), and then, completes auto-focusing.

In a case where the difference between the defocus amount D1 and the defocus amount D2 is smaller than the threshold value TH1 (step S6: YES), the system control unit 11 causes the phase difference AF processing unit 19 to perform a process of step S7.

When k phase difference detection pixels 52A disposed in the selected AF area 53 are represented as 52A(1) to 52A(k) according to their positions on the imaging surface 50, in step S7, the phase difference AF processing unit 19 adds up detection signals of the phase difference detection pixels 52A (n) (n is 1 to k) included in the captured image signals G1 and detection signals of the phase difference detection pixels 52A (n) included in the captured image signals G2.

The detection signals of the phase difference detection pixels 52A (n) included in the captured image signals G1 and the detection signals of the phase difference detection pixels 52A (n) included in the captured image signals G2 are obtained from the phase difference detection pixels 52A of which positions on the imaging surface 50 are the same, and thus, correspond to each other.

Similarly, when k phase difference detection pixels 52B disposed in the selected AF area 53 are represented as 52B(1) to 52B(k) according to their positions on the imaging surface 50, in step S7, the phase difference AF processing unit 19 adds up detection signals of the phase difference detection pixels 52B (n) (n is 1 to k) included in the captured image signals G1 and detection signals of the phase difference detection pixels 52B (n) included in the captured image signals G2.

The detection signals of the phase difference detection pixels 52B (n) included in the captured image signals G1 and the detection signals of the phase difference detection pixels 52B (n) included in the captured image signals G2 are obtained from the phase difference detection pixels 52B of which positions on the imaging surface 50 are the same, and thus, correspond to each other.

Further, in step S7, the phase difference AF processing unit 19 performs a correlation operation of a detection signal group of the phase difference detection pixels 52A after addition and a detection signal group of the phase difference detection pixels 52B after addition, and calculates a defocus amount Ds which is a second defocus amount, based on the correlation operation result. The phase difference AF processing unit 19 functions as a second defocus amount calculation unit.

That is, in step S7, the phase difference AF processing unit 19 adds up, with respect to detection signals of the phase difference detection pixels 52A in the range corresponding to the selected AF area 53 among captured image signals obtained by each of two instances of imaging which are consecutive, detection signals of which positions in the range are the same. Further, the phase difference AF processing unit 19 adds up, with respect to detection signals of the phase difference detection pixels 52B in the range corresponding to the selected AF area 53 among the captured image signals obtained by each of the two instances of imaging which are consecutive, detection signals of which positions in the range are the same. Further, the phase difference AF processing unit 19 calculates the defocus amount Ds using a detection signal group of the phase difference detection pixels 52A after addition and a detection signal group of the phase difference detection pixels 52B after addition.

After step S7, the system control unit 11 calculates a difference Δ1 (absolute value) between the defocus amount D1 and the defocus amount Ds and a difference Δ2 (absolute value) between the defocus amount D2 and the defocus amount Ds.

The system control unit 11 determines whether any one of Δ1 and Δ2 is equal to or larger than a threshold value TH2 (first threshold value) (step S8).

In a case where any one of Δ1 and Δ2 is equal to or larger than the threshold value TH2 (step S8: YES), the system control unit 11 performs a focusing control based on the contrast AF method in step S10.

In a case where both Δ1 and Δ2 are smaller than the threshold value TH2 (step S8: NO), the system control unit 11 moves the focus lens to a focusing position based on the defocus amount Ds (step S9), and completes auto-focusing.

As described above, in the digital camera shown in FIG. 1, in a case where a subject is dark, through comparison of the defocus amount D1 and the defocus amount D2, and the defocus amount Ds, the system control unit 11 determines whether to drive the focus lens based on the defocus amount Ds. The system control unit 11 functions as a determination unit.

That any one of differences between the defocus amount Ds calculated by adding up detection signals of phase difference detection pixels obtained by performing imaging two times and each of the defocus amounts D1 and D2 calculated without addition is large means that the reliability of the defocus amount Ds is low.

On the other hand, that both of the differences between the defocus amount Ds and each of the defocus amounts D1 and D2 are small means that the reliability of the defocus amount Ds is high.

Thus, by performing a focusing control based on the defocus amount Ds only when both of the differences between the defocus amount Ds and the defocus amounts D1 and D2 are small, it is possible to perform a focusing control with high accuracy even in a case where a subject is dark.

However, in the operation example of FIG. 7, the determination of step S6 is performed, but even in a case where the difference between the defocus amount D1 and the defocus amount D2 is equal to or larger than the threshold value TH1, a probability that differences between the defocus amount Ds and each of the defocus amounts D1 and D2 are smaller than a threshold value TH2 is not zero.

Accordingly, the procedure may proceed to step S7 after step S5 without performing the determination of step S6.

Further, according to the digital camera shown in FIG. 1, when a subject is bright, as in a general phase difference AF, a focusing control based on the defocus amount D2 is performed, and thus, it is possible to perform the focusing control at high speed with high accuracy.

In addition, according to the digital camera shown in FIG. 1, when any one of Δ1 and Δ2 is equal to or larger than the threshold value TH, a focusing control based on the contrast AF method is performed. Thus, even in a situation where a subject is dark and the reliability of the defocus amount Ds is low, it is possible to prevent auto-focusing from being disabled.

In step S10 of FIG. 7, the system control unit 11 may drive the focus lens based on the defocus amount D2 calculated from the latest image signals G2, instead of performing the contrast AF.

In this way, even in a situation where the subject is dark and the reliability of the defocus amount Ds is low, it is possible to prevent auto-focusing from being disabled. Further, since the procedure is performed without proceeding to the contrast AF method, it is possible to reduce the time for completing the auto-focusing.

In addition, in step S10 of FIG. 7, the system control unit 11 may notify a user by displaying that the auto-focusing is disabled on the display unit 23, for example, without performing the contras AF. In this case, the system control unit 11 functions as a notification unit.

With such a configuration, it is possible to request the user to transition to a mode where focus adjustment is manually performed at an early stage, to thereby reduce a probability of missing a shooting opportunity.

Further, in step S10 of FIG. 7, the system control unit 11 may terminate the process without performing the focusing control of the imaging optical system. Furthermore, in step S10 of FIG. 7, the system control unit 11 may perform a focusing control for moving the focus lens to a predetermined focusing position to complete the auto-focusing.

In the operation example of FIG. 7, an example in which when the subject is dark, the process of step S4 and the subsequent processes are performed is shown. However, the focusing control based on the defocus amount Ds is not only effective in a case where the subject is dark, but is also effective in an imaging situation where detection signal levels of phase difference detection pixels are low.

For example, in a case where an angle of a beam incident onto the imaging element 5 becomes large so that the intensity of light incident onto phase difference detection pixels becomes small (in wide angle imaging), the process of step S4 and the subsequent processes may be performed. Further, in a case where the detection signal levels of the phase difference detection pixels are low, the process of step S4 and the subsequent processes may be performed.

Further, in step S8 of FIG. 7, the system control unit 11 compares each of Δ1 and Δ2 with the threshold value TH2 to determine whether to perform a focusing control based on the defocus amount Ds. As a modification example thereof, the system control unit 11 may determine whether to perform the focusing control based on the defocus amount Ds according to a variation of Δ1 and Δ2.

For example, the system control unit 11 calculates a variance of Δ1 and Δ2 as a numerical value indicating the variation. In a case where the variance is smaller than a threshold value TH3 (second threshold value), the system control unit 11 determines that a focusing control based on the defocus amount Ds is to be performed, and performs a process of step S9. On the other hand, in a case where the variance is equal to or larger than the threshold value TH3, the system control unit 11 determines that the focusing control based on the defocus amount Ds is not to be performed, and performs a process of step S10.

That the variation of Δ1 and Δ2 is large may determine that the reliability of the value of the defocus amount Ds is low. Thus, even when it is determined whether to perform the focusing control based on the defocus amount Ds using the variation of Δ1 and Δ2, it is possible to obtain the same effects as in the operation example of FIG. 7.

In the operation example of FIG. 7, two captured image signals are obtained in step S4, and two defocus amounts are calculated in step S5. Then, the two captured image signals are added up in step S7 to calculate the defocus amount.

However, in step S4, a configuration in which three or more new image signals are acquired from captured image signals obtained through consecutive imaging, defocus amounts D1, D2, D3, and so on are respectively calculated in step S5 from the three or more captured image signals, the defocus amount Ds is calculated from signals obtained by adding up detection signals of corresponding phase difference detection pixels among the three or more captured image signals in step S7, and it is determined whether to perform the process of step S9 through comparison of the three or more defocus amounts D1, D2, D3, and so on and the defocus amount Ds, may be used.

Figure 8:
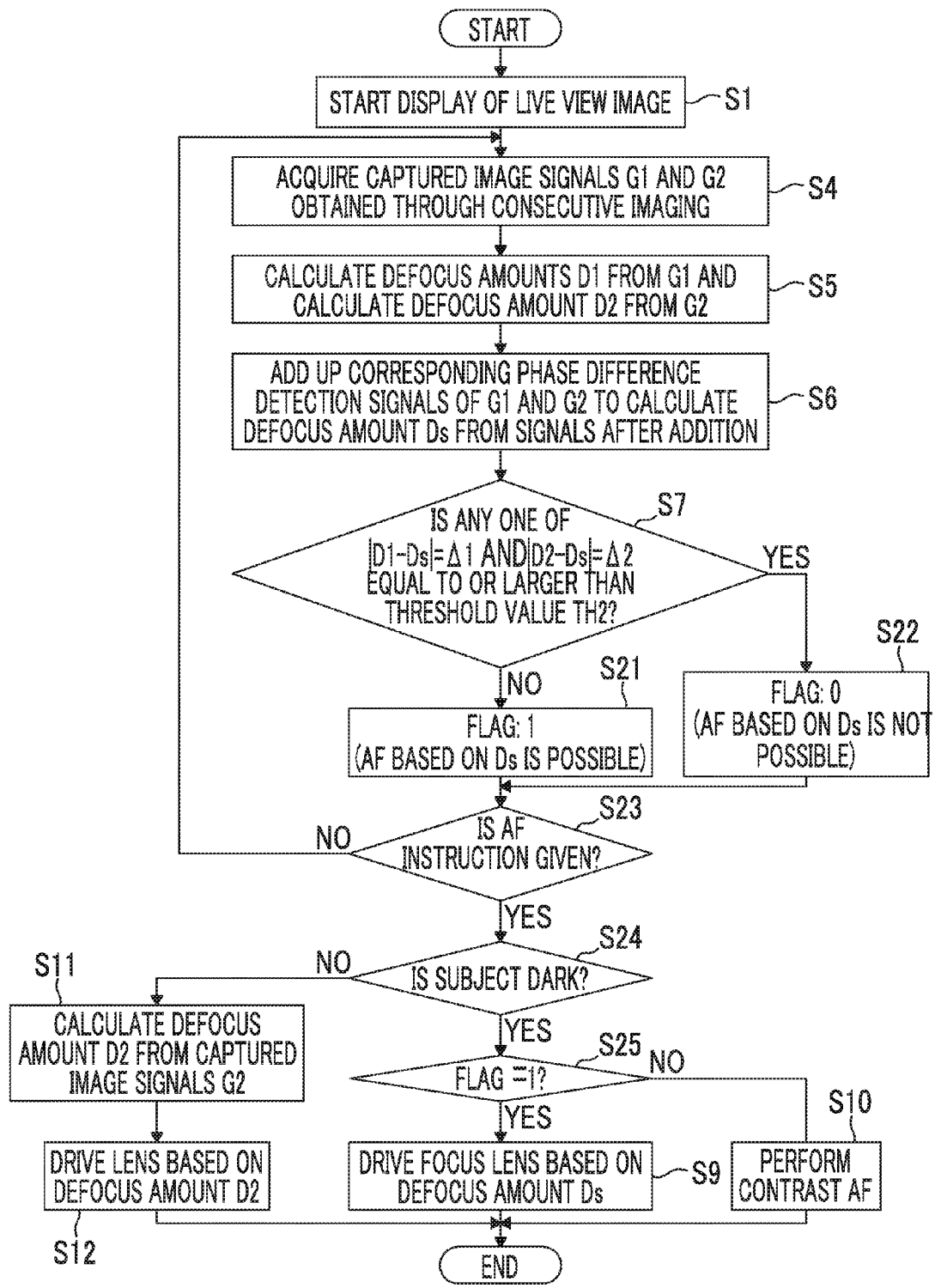
FIG. 8 is a flowchart illustrating a modification example of the auto-focus operation of the digital camera shown in FIG. 1.

FIG. 8 is a flowchart illustrating a modification example of the operation of the digital camera shown in FIG. 1. In FIG. 8, the same reference numerals are given to the same processes as in FIG. 7, and description thereof will not be repeated.

In the operation example of FIG. 8, after step S1 described in FIG. 7, the processes of step S4 to step S7 are performed.

Further, if the determination in step S7 is NO, the system control unit 11 sets a flag of the internal memory to "1" in step S21. In addition, if the determination in step S7 is YES, the system control unit 11 sets a flag of the internal memory to "0" in step S22.

After step S21 and step S22, if there is an auto-focus execution instruction (step S23: YES), the system control unit 11 determines the brightness of a subject by the same method as in step S2 of FIG. 7 (step S24). In a case where there is no auto-focus execution instruction (step S23: NO), the procedure returns to the process of step S4.

When the determination in step S24 is NO, the processes of steps S11 and S12 are sequentially performed, and then, the auto-focusing is completed.

When the determination in step S24 is YES, the system control unit 11 checks the flag of the internal memory (step S25). If the flag is 1, the system control unit 11 performs the process of step S9, and if the flag is 0, the system control unit 11 performs the process of step S10.

As described above, according to the operation example of FIG. 8, before the auto-focus execution instruction is given, the system control unit 11 determines whether to perform the focusing control based on the defocus amount Ds. Thus, it is possible to reduce a time until the auto-focusing is completed from the time when the auto-focus execution instruction is given, compared with that in the example of FIG. 7. Accordingly, it is possible to perform the auto-focusing at high speed.

Figure 9:
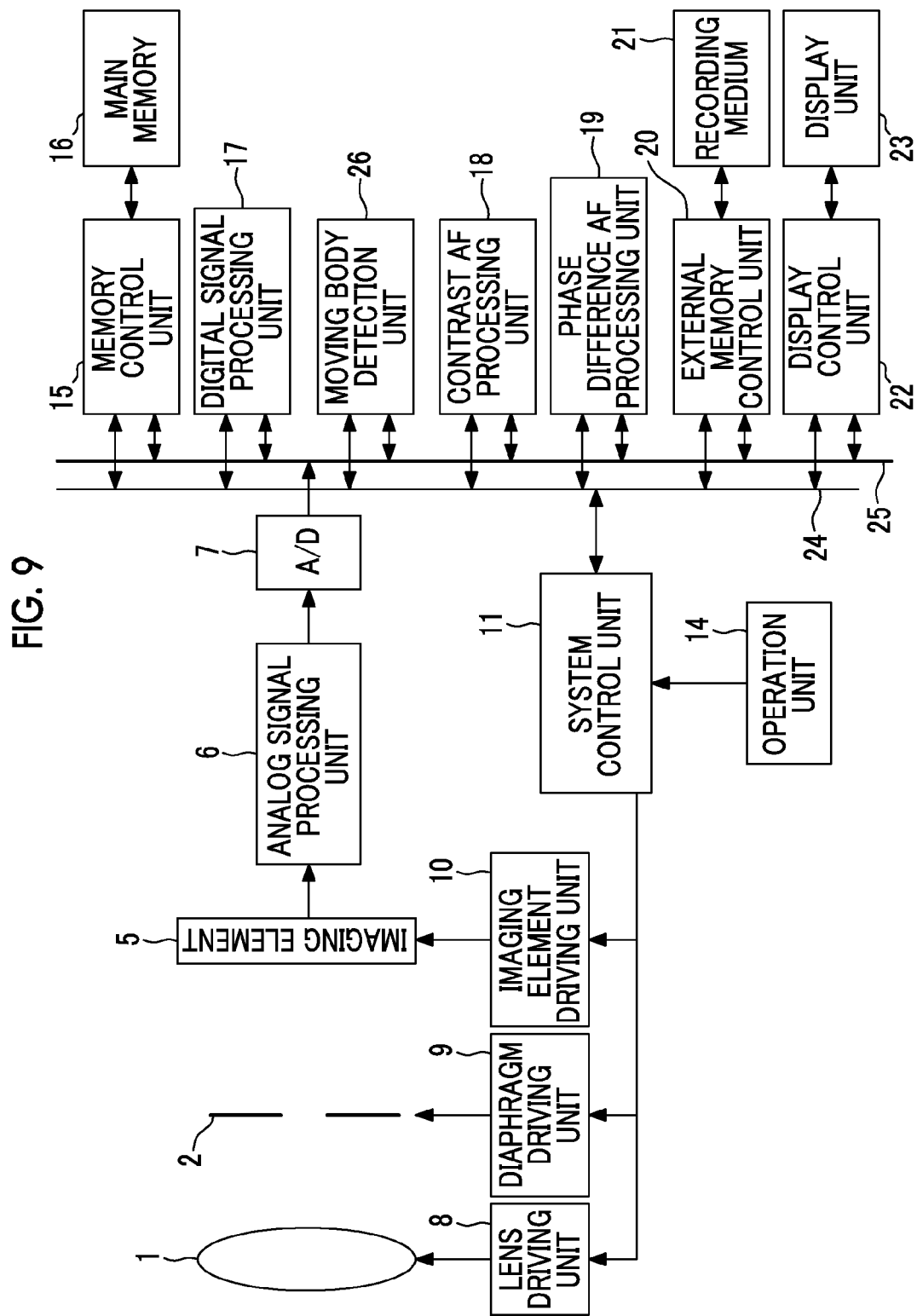
FIG. 9 is a diagram illustrating a modification example of a block configuration of the digital camera shown in FIG. 1.

FIG. 9 is a diagram illustrating a modification example of the digital camera shown in FIG. 1. The digital camera shown in FIG. 9 has the same configuration as in FIG. 1 except that a moving body detection unit 26 is additionally provided.

The moving body detection unit 26 detects whether a moving body is included in a subject which is being imaged, using plural captured image signals obtained through consecutive imaging in the imaging element 5.

The moving body detection unit 26 calculates a motion vector of a main subject in a selected AF area 53 through comparison (for example, block matching, the method disclosed in JP2001-330882A, or the like) of image signals obtained from the selected AF area 53 among the plural captured image signals.

If the size of the motion vector is equal to or larger than a predetermined value, the moving body detection unit 26 determines that there is a moving body, and if the size of the motion vector is smaller than the predetermined value, the moving body detection unit 26 determines that there is no moving body.

In a case where it is detected by the moving body detection unit 26 that there is a moving body, in step S5 in FIGS. 7 and 8, the phase difference AF processing unit 19 of the digital camera shown in FIG. 9 moves a position in a range corresponding to the AF area 53 set for each of the captured image signals G1 and G2 according to a movement of the moving body to calculate a first defocus amount. Further, in a case where it is detected by the moving body detection unit 26 that there is the moving body, in step S7 in FIGS. 7 and 8, the phase difference AF processing unit 19 moves the position in the range corresponding to the AF area 53 set for each of the captured image signals G1 and G2 according to the movement of the moving body to calculate a second defocus amount.

Figure 10A:
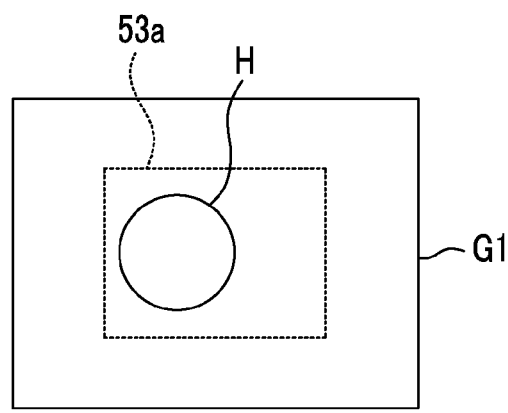
FIGS. 10A to 10C are diagrams illustrating modification example of the auto-focus operation of the digital camera shown in FIG. 1.
Figure 10B:
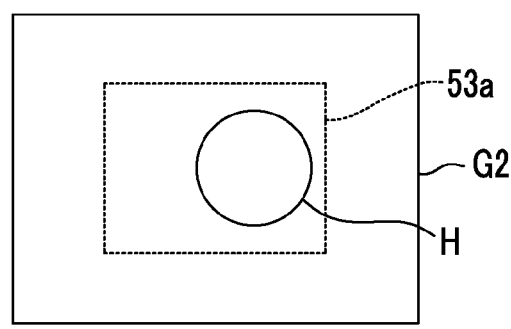
Figure 10C:
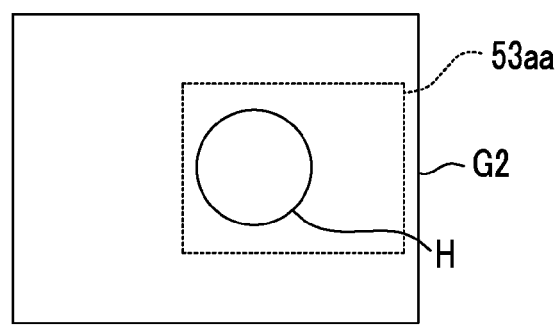

FIGS. 10A to 10C are diagrams illustrating a calculation procedure of the defocus amount D2 in the phase difference AF processing unit 19 of the digital camera of FIG. 9.

FIG. 10A shows captured image signals G1. In FIG. 10A, a range 53a corresponding to a selected AF area 53 among the captured image signals G1 is shown.

FIG. 10B shows captured image signals G2. In FIG. 10B, a range 53a corresponding to a selected AF area 53 among the captured image signals G2 is shown. As understood from comparison FIG. 10A and FIG. 10B, an object H included in the captured image signals G1 and G2 is detected by the moving body detection unit 26 as a moving body that moves rightward.

In a case where the moving body H is detected by the moving body detection unit 26, the phase difference AF processing unit 19 of the digital camera shown in FIG. 9 moves the range 53a of image signals to be extracted from the captured image signals G2 in a direction based on a motion vector of the moving body H by the size of the motion vector, as shown in FIG. 10C. A range after movement is indicated by reference numeral 53aa.

In this state, the phase difference AF processing unit 19 calculates a defocus amount D2 using detection signals of phase difference detection pixels included in an image signal in the range 53aa in FIG. 10C.

Further, in a case where the moving body H is detected by the moving body detection unit 26, the phase difference AF processing unit 19 adds up a detection signal of each phase difference detection pixel 52 in the range 53a of the captured image signals G1 shown in FIG. 10A and a detection signal disposed at the same position as the former detection signal in the range 53aa of the captured image signals G2 shown in FIG. 10C, in step S7 of FIGS. 7 and 8. Furthermore, the phase difference AF processing unit 19 calculates a defocus amount Ds using the detection signals after addition.

In the ranges 53a and 53aa, for example, when an upper left corner is set as the original, if coordinates of a detection signal of an arbitrary phase difference detection pixel 52 are represented as (xi, yi) in each range, the detection signal at the same position refers to a detection signal having the same coordinates (xi, yi).

In this way, when the moving body is detected, the digital camera of FIG. 9 does not fix the selected AF area 53, and moves the AF area 53 to follow the moving body. With such a configuration, it is possible to prevent the position of a main portion from being greatly changed between an image based on image signals in the range 53a of the captured image signals G1 and an image based on image signals corresponding to the AF area 53 in the range 53aa of the captured image signals G2. Thus, it is possible to enhance the accuracy of determination of whether to perform a focusing control based on the defocus amount Ds.

In the description of FIGS. 10A to 10C, the size of the range 53a corresponding to the AF area 53 is fixed, but when the moving body is detected, the size of the range 53a may be changed according to the area of the detected moving body.

Figure 11A:
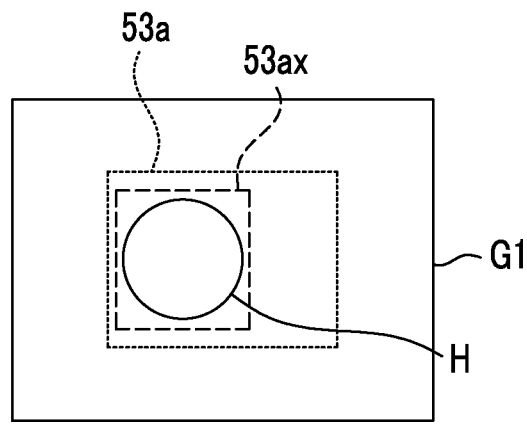
FIGS. 11A and 11B are diagrams illustrating modification example of the auto-focus operation of the digital camera shown in FIG. 1.
Figure 11B:
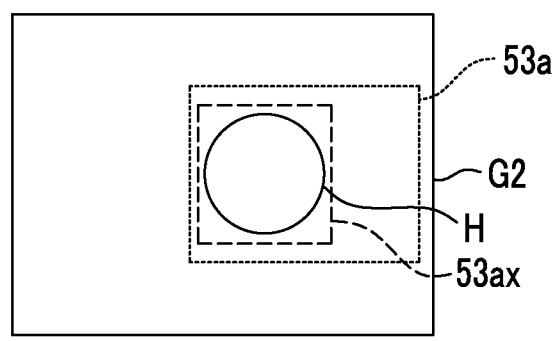

For example, as shown in FIGS. 11A and 11B, the range 53a is reduced to a range 53ax. Thus, in the range 53ax, the proportion of a background of the moving body H is reduced, compared with the range 53a.

Thus, a matching rate of an image based on image signals in the range 53ax of the captured image signals G1 and an image based on image signals in the range 53ax of the captured image signals G2 is increased. As a result, it is possible to enhance the accuracy of determination of whether to perform a focusing control based on the defocus amount Ds.

It is preferable that the digital camera shown in FIG. 9 has a known camera shake correction function. By providing the camera shake correction function, camera shake of an image captured by the imaging element 5 is reduced. Thus, it is possible to prevent a movement of the entire image, and to detect only a moving body by the moving body detection unit 26 with high accuracy. As a result, it is possible to enhance the accuracy of determination of whether to perform the focusing control based on the defocus amount Ds.

In this embodiment, an example in which the digital camera is used as the imaging device is shown, but hereinafter, an embodiment in which a smart phone with a camera is used as the imaging device will be described.

Figure 12:
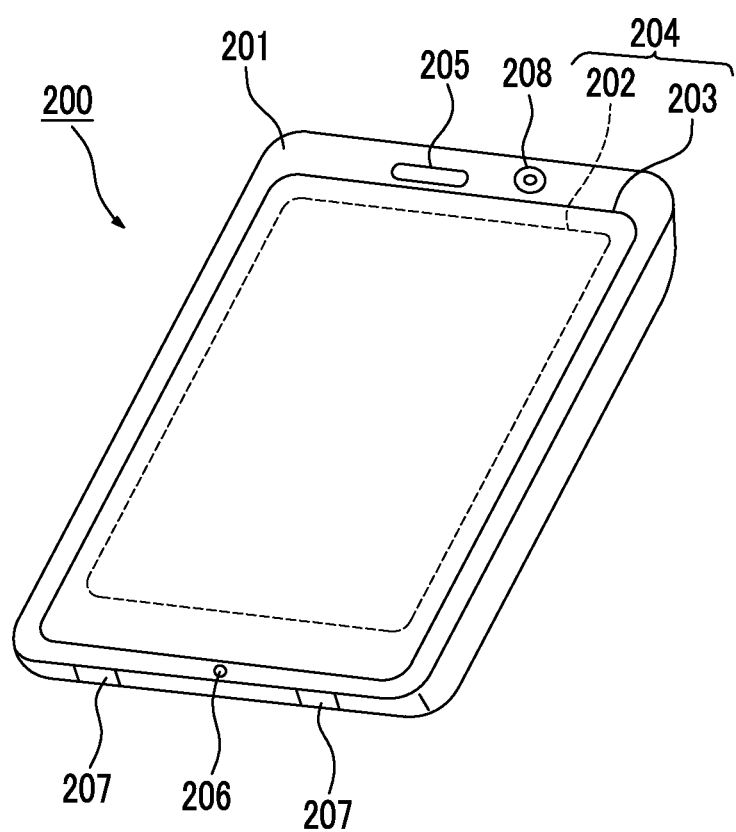
FIG. 12 is a diagram illustrating a smart phone which is an imaging device.

FIG. 12 is a diagram showing an appearance of a smart phone 200 which is an embodiment of the imaging device of the invention. The smart phone 200 shown in FIG. 12 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 13:
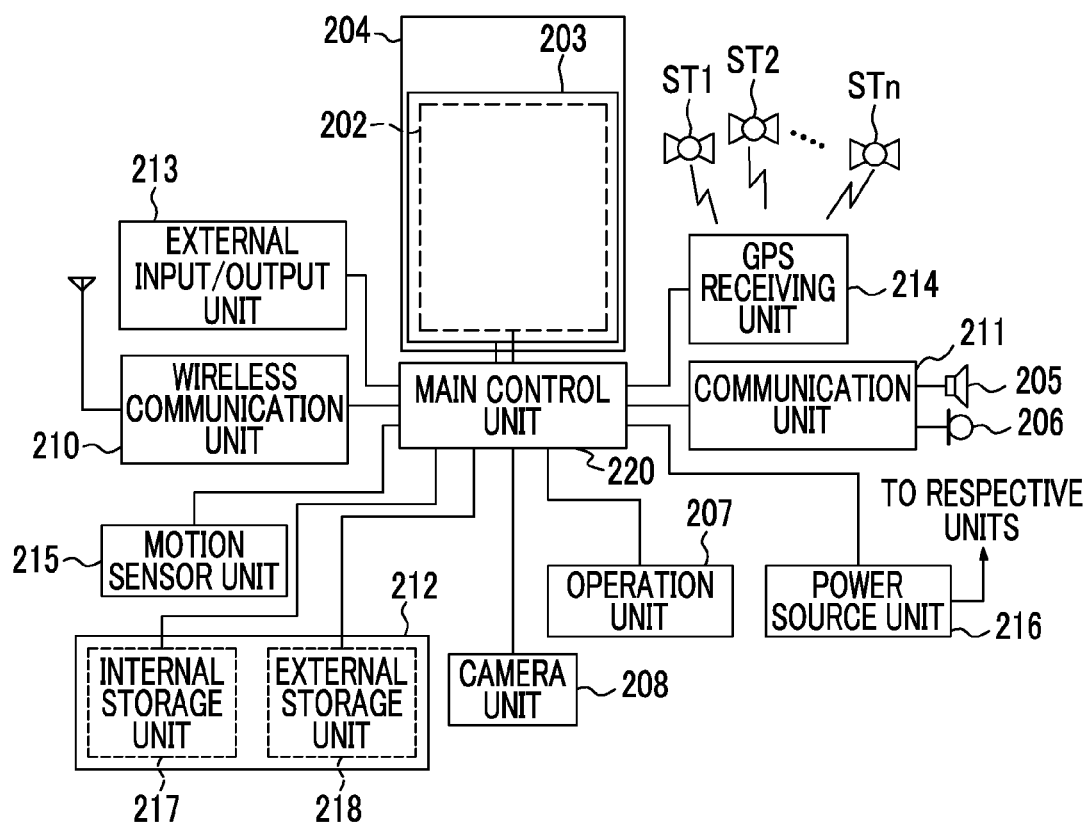
FIG. 13 is an internal block diagram of the smart phone shown in FIG. 12.

FIG. 13 is a block diagram illustrating the configuration of the smart phone 200 shown in FIG. 12. As shown in FIG. 13, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source unit 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a static image and a video image), character information, or the like under the control of the main control unit 220 to visually transmit the result to a user, and detects a user operation with respect to the displayed information. The display input unit 204 includes the display panel 202 and the operation panel 203.

The display panel 202 uses a liquid crystal display (LCD), an organic electro-luminescence display (OLED), or the like as a display device.

The operation panel 203 is a device that is mounted so that an image displayed on a display surface of the display panel 202 can be visually recognized and detects one or plural coordinates operated by a user's finger or a stylus. If the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 12, the display panel 202 and the operation panel 203 of the smart phone 200 shown as an example of one embodiment of the imaging device of the invention are integrated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may completely be the same, but it is not essential that both of the sizes are the same. Further, the operation panel 203 may include two sensitive regions of an outer edge portion and an inner portion other than the outer edge portion. Further, the width of the outer edge portion is appropriately set according to the size or the like of the housing 201. Furthermore, as a position detecting method employed in the operation panel 203, any one of a matrix switch type, a resistive film type, a surface acoustic wave type, an infrared type, an inductive coupling type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 12, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from a user.

For example, as shown in FIG. 12, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 provided in the smart phone, and an external storage section 218 provided with a detachable memory slot. Each of the internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As the external device connected to the smart phone 200, for example, a wired or wireless headset, a wired or wireless external charger, a wired or wireless data port, a memory card, a subscriber identity module card (SIM) or a user identity module card (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, both a personal computer and a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source unit 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mails, a Web browsing function for browsing Web pages, or the like is used.

Further, the main control unit 220 has an image processing function, for example, for displaying an image on the display input unit 204 based on image data (data on a static image or a video image) such as received data or downloaded streaming data. The image processing function refers to a function for decoding the image data by the main control unit 220, performing image processing with respect to the decoded image data, and displaying an image on the display input unit 204.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 12, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Furthermore, when detecting the position using the GPS receiving unit 214, it is possible to detect the position with reference to the image from the camera unit 208. In addition, it is possible to determine an optical axis direction of the camera unit 208 of the smart phone 200 without using the triaxial acceleration sensor or by using the triaxial acceleration sensor together with reference to the image from the camera unit 208, or a current usage environment. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a static image or a video image, and the result may be recorded in the storage unit 212, or may be output through the input/output unit 213 or the wireless communication unit 210.

In the smart phone 200 having the above-described configuration, similarly, by using the imaging element 5 as the imaging element of the camera unit 208, and by performing the processes shown in FIGS. 7, 8, 10, and 11 in the main control unit 220, it is possible to perform high-quality focusing control with high accuracy.

As described above, this specification discloses the following content.

According to the disclosure, an imaging device includes: an imaging element that includes a first signal detection unit that detects a signal corresponding to one beam among a pair of beams that passes through different portions in a pupil region of an imaging optical system and a second signal detection unit that detects a signal corresponding to the other beam among the pair of beams, and images a subject through the imaging optical system; a first defocus amount calculation unit that calculates a plurality of first defocus amounts using detection signals of the first signal detection units and detection signals of the second signal detection units in a range corresponding to an area which is a focusing target on an imaging surface of the imaging element, among captured image signals obtained through each of a plurality of instances of imaging consecutively performed by the imaging element; a second defocus amount calculation unit that adds up, with respect to the detection signals of the first signal detection units in the range among the captured image signals obtained through each of the plurality of instances of imaging, detection signals at the same position in the range, adds up, with respect to the detection signals of the second signal detection units in the range among the captured image signals obtained through each of the plurality of instances of imaging, detection signals at the same position in the range, and calculates a second defocus amount using the detection signals of the first signal detection units and the detection signals of the second signal detection units after addition; and a determination unit that determines whether to perform a focusing control of the imaging optical system based on the second defocus amount through comparison of the plurality of first defocus amounts and the second defocus amount.

In the above imaging device, in a case where differences between each of the plurality of first defocus amounts and the second defocus amount are all smaller than a first threshold value, the determination unit may determine that the focusing control of the imaging optical system based on the second defocus amount is to be performed.

In the above imaging device, in a case where a variation of differences between each of the plurality of first defocus amounts and the second defocus amount is smaller than a second threshold value, the determination unit may determine that the focusing control of the imaging optical system based on the second defocus amount is to be performed.

In the above imaging device, in a case where the brightness of the subject to be imaged by the imaging element is smaller than a threshold value, the determination unit may perform the determination.

The above imaging device may further include: a notification unit that notifies, in a case where it is determined by the determination unit that the focusing control of the imaging optical system based on the second defocus amount is not to be performed, that the focusing control of the imaging optical system is not possible.

In the above imaging device, in a case where it is determined by the determination unit that the focusing control of the imaging optical system based on the second defocus amount is not to be performed, the focusing control may not be performed, or may be performed according to a predetermined focusing position.

In the above imaging device, the determination unit may perform the determination before an execution instruction of the focusing control of the imaging optical system is given.

The above imaging device may further include: a moving body detection unit that detects whether a moving body is included in the subject which is being imaged using the captured image signals obtained through each of the plurality of instances of imaging, in which in a case where it is detected by the moving body detection unit that the moving body is included in the subject, the first defocus amount calculation unit may move the range set with respect to the captured image signals obtained through the plurality of instances of imaging according to a movement of the moving body to calculate the first defocus amounts, and in a case where it is detected by the moving body detection unit that the moving body is included in the subject, and the second defocus amount calculation unit may move the range set with respect to the captured image signals obtained through the plurality of instances of imaging according to the movement of the moving body to calculate the second defocus amount.

In the above imaging device, in a case where the moving body is detected by the moving body detection unit, the first defocus amount calculation unit and the second defocus amount calculation unit may change the size of the range set with respect to the captured image signals obtained through the plurality of instances of imaging according to the size of the moving body.

According to the disclosure, a focusing control method includes: a first defocus amount calculation step of calculating a plurality of first defocus amounts using detection signals of the first signal detection units and the detection signals of the second signal detection units in a range corresponding to an area which is a focusing target on an imaging surface of the imaging element, among captured image signals obtained through each of a plurality of instances of imaging consecutively performed by an imaging element that includes a first signal detection unit that detects a signal corresponding to one beam among a pair of beams that passes through different portions in a pupil region of an imaging optical system and a second signal detection unit that detects a signal corresponding to the other beam among the pair of beams, and images a subject through the imaging optical system; a second defocus amount calculation step of adding up, with respect to the detection signals of the first signal detection units in the range among the captured image signals obtained through each of the plurality of instances of imaging, detection signals at the same position in the range, adding up, with respect to the detection signals of the second signal detection units in the range among the captured image signals obtained through each of the plurality of instances of imaging, detection signals at the same position in the range, and calculating a second defocus amount using the detection signals of the first signal detection units and the detection signals of the second signal detection units after addition; and a determination step of determining whether to perform a focusing control of the imaging optical system based on the second defocus amount through comparison of the plurality of first defocus amounts and the second defocus amount.

INDUSTRIAL APPLICABILITY

The invention is applied to a digital camera or the like to provide high convenience and effectiveness.

EXPLANATION OF REFERENCES

1: imaging lens
2: diaphragm
5: imaging element
11: system control unit (notification unit, determination unit)
18: contrast AF processing unit
19: phase difference AF processing unit (first defocus amount calculation unit, second defocus amount calculation unit)
26: moving body detection unit
50: imaging surface
51: pixel
52, 52A, 52B: phase difference detection pixel
53: AF area

What is claimed is:
1. An imaging device comprising:
an imaging element that includes a first signal detection unit including a plurality of pixels that detects a signal corresponding to one beam among a pair of beams that passes through different portions in a pupil region of an imaging optical system and a second signal detection unit including a plurality of pixels that detects a signal corresponding to the other beam among the pair of beams, and images a subject through the imaging optical system; and
a processing circuitry configured to:

calculate a plurality of first defocus amounts using detection signals of the first signal detection units and detection signals of the second signal detection units in a range corresponding to an area which is a focusing target on an imaging surface of the imaging element, among captured image signals obtained through each of a plurality of instances of imaging consecutively performed by the imaging element;

add up, with respect to the detection signals of the first signal detection units in the range among the captured image signals obtained through each of the plurality of instances of imaging, detection signals of the pixels at the same position among the plurality of pixels of the first signal detection units in the range, add up, with respect to the detection signals of the second signal detection units in the range among the captured image signals obtained through each of the plurality of instances of imaging, detection signals of the pixels at the same position among the plurality of pixels of the second signal detection units in the range, and calculate a second defocus amount using the detection signals of the first signal detection units and the detection signals of the second signal detection units after addition; and determine whether to perform a focusing control of the imaging optical system based on the second defocus amount through comparison of the plurality of first defocus amounts and the second defocus amount.

2. The imaging device according to claim 1,
wherein in a case where differences between each of the plurality of first defocus amounts and the second defocus amount are all smaller than a first threshold value, the processing circuitry determines that the focusing control of the imaging optical system based on the second defocus amount is to be performed.

3. The imaging device according to claim 1,
wherein in a case where a variation of differences between each of the plurality of first defocus amounts and the second defocus amount is smaller than a second threshold value, the processing circuitry determines that the focusing control of the imaging optical system based on the second defocus amount is to be performed.

4. The imaging device according to claim 1,
wherein in a case where the brightness of the subject to be imaged by the imaging element is lower than a threshold value, the processing circuitry performs the determination.

5. The imaging device according to claim 2,
wherein in a case where the brightness of the subject to be imaged by the imaging element is lower than a threshold value, the processing circuitry performs the determination.

6. The imaging device according to claim 3,
wherein in a case where the brightness of the subject to be imaged by the imaging element is lower than a threshold value, the processing circuitry performs the determination.

7. The imaging device according to claim 1, wherein the processing circuitry is further configured to:
notify, in a case where it is determined that the focusing control of the imaging optical system based on the second defocus amount is not to be performed, that the focusing control of the imaging optical system is not possible.

8. The imaging device according to claim 2, wherein the processing circuitry is further configured to:
notify, in a case where it is determined that the focusing control of the imaging optical system based on the second defocus amount is not to be performed, that the focusing control of the imaging optical system is not possible.

9. The imaging device according to claim 3, wherein the processing circuitry is further configured to:
notify, in a case where it is determined that the focusing control of the imaging optical system based on the second defocus amount is not to be performed, that the focusing control of the imaging optical system is not possible.

10. The imaging device according to claim 4, wherein the processing circuitry is further configured to:
notify, in a case where it is determined that the focusing control of the imaging optical system based on the second defocus amount is not to be performed, that the focusing control of the imaging optical system is not possible.

11. The imaging device according to claim 5, wherein the processing circuitry is further configured to:
notify, in a case where it is determined that the focusing control of the imaging optical system based on the second defocus amount is not to be performed, that the focusing control of the imaging optical system is not possible.

12. The imaging device according to claim 6, wherein the processing circuitry is further configured to:
notify, in a case where it is determined that the focusing control of the imaging optical system based on the second defocus amount is not to be performed, that the focusing control of the imaging optical system is not possible.

13. The imaging device according to claim 1,
wherein in a case where it is determined by the by the processing circuitry that the focusing control of the imaging optical system based on the second defocus amount is not to be performed, the focusing control is not performed, or is performed according to a predetermined focusing position.

14. The imaging device according to claim 2,
wherein in a case where it is determined by the processing circuitry that the focusing control of the imaging optical system based on the second defocus amount is not to be performed, the focusing control is not performed, or is performed according to a predetermined focusing position.

15. The imaging device according to claim 3,
wherein in a case where it is determined by the processing circuitry that the focusing control of the imaging optical system based on the second defocus amount is not to be performed, the focusing control is not performed, or is performed according to a predetermined focusing position.

16. The imaging device according to claim 4,
wherein in a case where it is determined by the processing circuitry that the focusing control of the imaging optical system based on the second defocus amount is not to be performed, the focusing control is not performed, or is performed according to a predetermined focusing position.

17. The imaging device according to claim 1,
wherein the processing circuitry performs the determination before an execution instruction of the focusing control of the imaging optical system is given.

18. The imaging device according to claim 1, wherein the processing circuitry is further configured to:

detect whether a moving body is included in the subject which is being imaged using the captured image signals obtained through each of the plurality of instances of imaging, wherein in a case where it is detected that a moving body is included in the subject, the processing circuitry moves the range set with respect to the captured image signals obtained through the plurality of instances of imaging according to a movement of the moving body to calculate the first defocus amounts, and wherein in a case where it is detected that a moving body is included in the subject, the processing circuitry moves the range set with respect to the captured image signals obtained through the plurality of instances of imaging according to the movement of the moving body to calculate the second defocus amount.

19. The imaging device according to claim 18, wherein in a case where a moving body is detected, the processing circuitry changes the size of the range set with respect to the captured image signals obtained through the plurality of instances of imaging according to the size of the moving body.

20. A focusing control method of the imaging device according to claim 1 comprising:

a first defocus amount calculation step of calculating a plurality of first defocus amounts using detection signals of the first signal detection units and detection signals of the second signal detection units in a range corresponding to an area which is a focusing target on an imaging surface of the imaging element, among captured image signals obtained through each of a plurality of instances of imaging consecutively performed by an imaging element that includes a first signal detection unit including a plurality of pixels that detects a signal corresponding to one beam among a pair of beams that passes through different portions in a pupil region of an imaging optical system and a second signal detection unit including a plurality of pixels that detects a signal corresponding to the other beam among the pair of beams, and images a subject through the imaging optical system;

a second defocus amount calculation step of adding up, with respect to the detection signals of the first signal detection units in the range among the captured image signals obtained through each of the plurality of instances of imaging, detection signals of the pixels at the same position among the plurality of pixels of the first signal detection units in the range, adding up, with respect to the detection signals of the second signal detection units in the range among the captured image signals obtained through each of the plurality of instances of imaging, detection signals of the pixels at the same position among the plurality of pixels of the second signal detection units in the range, and calculating a second defocus amount using the detection signals of the first signal detection units and the detection signals of the second signal detection units after addition; and a determination step of determining whether to perform a focusing control of the imaging optical system based on the second defocus amount through comparison of the plurality of first defocus amounts and the second defocus amount.

* * * * *